(12) United States Patent
Hasegawa et al.

(10) Patent No.: US 9,963,201 B2
(45) Date of Patent: May 8, 2018

(54) BICYCLE HYDRAULIC COMPONENT

(71) Applicant: Shimano Inc., Sakai, Osaka (JP)

(72) Inventors: Makoto Hasegawa, Sakai (JP); Takeshi Koga, Sakai (JP)

(73) Assignee: SHIMANO INC., Osaka (JP)

( * ) Notice: Subject to any disclaimer, the term of this patent is extended or adjusted under 35 U.S.C. 154(b) by 14 days.

(21) Appl. No.: 14/883,643

(22) Filed: Oct. 15, 2015

(65) Prior Publication Data

US 2017/0106943 A1  Apr. 20, 2017

(51) Int. Cl.
*B62M 25/08* (2006.01)
*F16L 55/11* (2006.01)
*F15B 21/00* (2006.01)
*B62L 1/00* (2006.01)
*B62K 23/06* (2006.01)
*B62L 3/02* (2006.01)
*F15B 7/08* (2006.01)

(52) U.S. Cl.
CPC ........... *B62M 25/08* (2013.01); *B62K 23/06* (2013.01); *B62L 1/005* (2013.01); *B62L 3/023* (2013.01); *F15B 7/08* (2013.01); *F15B 21/005* (2013.01); *F16L 55/11* (2013.01); *F16L 55/1108* (2013.01); *F16L 55/1133* (2013.01)

(58) Field of Classification Search
CPC ........ B62K 23/00; B62K 23/02; B62K 23/06; B62L 1/005; B62L 3/023; B62M 25/08; F15B 7/08; F15B 12/005; F15B 21/005; F16L 55/11; F16L 55/1108; F16L 55/1133
See application file for complete search history.

(56) References Cited

U.S. PATENT DOCUMENTS

| 3,823,989 | A | * | 7/1974 | Boggs | F16N 21/06 305/100 |
|---|---|---|---|---|---|
| 5,092,797 | A | * | 3/1992 | Cole | H01R 4/5091 411/2 |
| 5,226,452 | A | | 7/1993 | Muller et al. | |
| 5,829,478 | A | | 11/1998 | Pape et al. | |
| 6,029,686 | A | * | 2/2000 | Pirkle | F16K 31/002 137/315.25 |
| 6,484,855 | B1 | * | 11/2002 | Yaple | B62L 3/023 180/219 |
| 7,578,375 | B2 | * | 8/2009 | Lin | B60T 7/10 188/344 |
| 7,681,513 | B1 | * | 3/2010 | Hundertmark | B63H 20/12 114/144 R |
| 2013/0001891 | A1 | * | 1/2013 | Tower | F02M 55/005 277/591 |
| 2013/0068577 | A1 | | 3/2013 | Kuan | |

FOREIGN PATENT DOCUMENTS

DE  69200545 T2  3/1995
DE  102012108714 A1  3/2013

* cited by examiner

*Primary Examiner* — Logan Kraft

(57) ABSTRACT

A bicycle hydraulic component includes a base, a plug, and a fluid stopper. The base includes a hydraulic chamber, a first bore having a first bore diameter and being in fluid communication with the hydraulic chamber, a second bore extending from the first bore and having a second bore diameter greater than the first bore diameter, and a seat surface extending between the first bore and the second bore. The plug is coupled to the second bore. The fluid stopper is configured to be accommodated in the second bore and to be pressed by the plug to seal the first bore. The fluid stopper is an individual member with respect to the plug.

14 Claims, 5 Drawing Sheets

BICYCLE HYDRAULIC COMPONENT

TECHNICAL FIELD

The present invention generally relates to a bicycle hydraulic component.

BACKGROUND

There are various kinds of bicycle hydraulic systems. A bicycle hydraulic system (e.g., bicycle hydraulic brake) includes a hydraulic operating device (e.g., brake lever), a hydraulic operated device (e.g., brake caliper), and a hydraulic hose, which connects the hydraulic operating device and the hydraulic operated device. In the hydraulic operating device, pivotal movement of an operation portion (e.g., brake lever arm) moves a piston in a hydraulic chamber. The movement of the piston discharges fluid from the hydraulic chamber. The discharged fluid flows through a hydraulic passage that extends through a base (also referred to as body) of the hydraulic operating device, the hydraulic hose, and a hydraulic passage that extends through a base of the hydraulic operated device to drive a piston located in a hydraulic chamber of the hydraulic operated device.

A wide variety of bicycle hydraulic systems have been developed. This has increased the types of bicycle hydraulic components such as a hydraulic operating device and a hydraulic operated device. Additionally, complicated hydraulic passages are formed in bases of the bicycle hydraulic components. The bases of the bicycle hydraulic components are often bored to form the hydraulic passages. The boring forms an opening that is located in an outer surface of the base. To permanently close the opening and seal the hydraulic passage of the bicycle hydraulic component, a seal member incorporating an O-ring is fitted to the opening from an outer side of the base.

SUMMARY

The present invention provides a bicycle hydraulic component that is easily manufactured and has a fluid sealing capability.

One aspect of the present invention is a bicycle hydraulic component that includes a base, a plug, and a fluid stopper. The base includes a hydraulic chamber, a first bore having a first bore diameter and being in fluid communication with the hydraulic chamber, a second bore extending from the first bore and having a second bore diameter greater than the first bore diameter, and a seat surface extending between the first bore and the second bore. The plug is coupled to the second bore. The fluid stopper is configured to be accommodated in the second bore and to be pressed by the plug to seal the first bore. The fluid stopper is an individual member with respect to the plug.

In one implementation, the plug includes an end face that contacts the fluid stopper and presses the fluid stopper onto the seat surface.

In one implementation, the fluid stopper directly contacts the seat surface, and the plug directly contacts the fluid stopper.

In one implementation, the fluid stopper has a center point, the first bore has a bore axis, and the seat surface is configured such that the plug presses the fluid stopper to align the center point of the fluid stopper with the bore axis of the first bore.

In one implementation, the seat surface includes an annular inclined surface inwardly inclined from the second bore toward the first bore.

In one implementation, wherein a gap is defined between a wall surface of the second bore and a radially outermost surface of the fluid stopper.

In one implementation, the second bore includes an internal thread, and the plug is a bolt including an external thread meshed with the internal thread of the second bore.

In one implementation, the plug is a shear head bolt.

In one implementation, the seat surface includes an inner edge defining a circular opening, and the fluid stopper engages with the inner edge and seals the circular opening.

In one implementation, the fluid stopper includes a spherical or semispherical outer surface.

In one implementation, the fluid stopper is a ball.

In one implementation, the ball has a diameter of 2 to 3.5 mm.

In one implementation, the second bore includes an outer opening in an outer surface of the base, and the plug is configured to close the outer opening of the second bore.

In one implementation, the fluid stopper and the base including the seat surface are metallic members.

In one implementation, the fluid stopper is a metallic member, and the base including the seat surface is a synthetic resin member.

In one implementation, the plug is press-fitted to the second bore.

In one implementation, the first bore is located at an end of a hydraulic passage which is in direct or indirect communication with the hydraulic chamber.

In one implementation, the base is at least one of a main body of a bicycle hydraulic operating device and a main body of a bicycle hydraulic operated device.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

Figure 1:
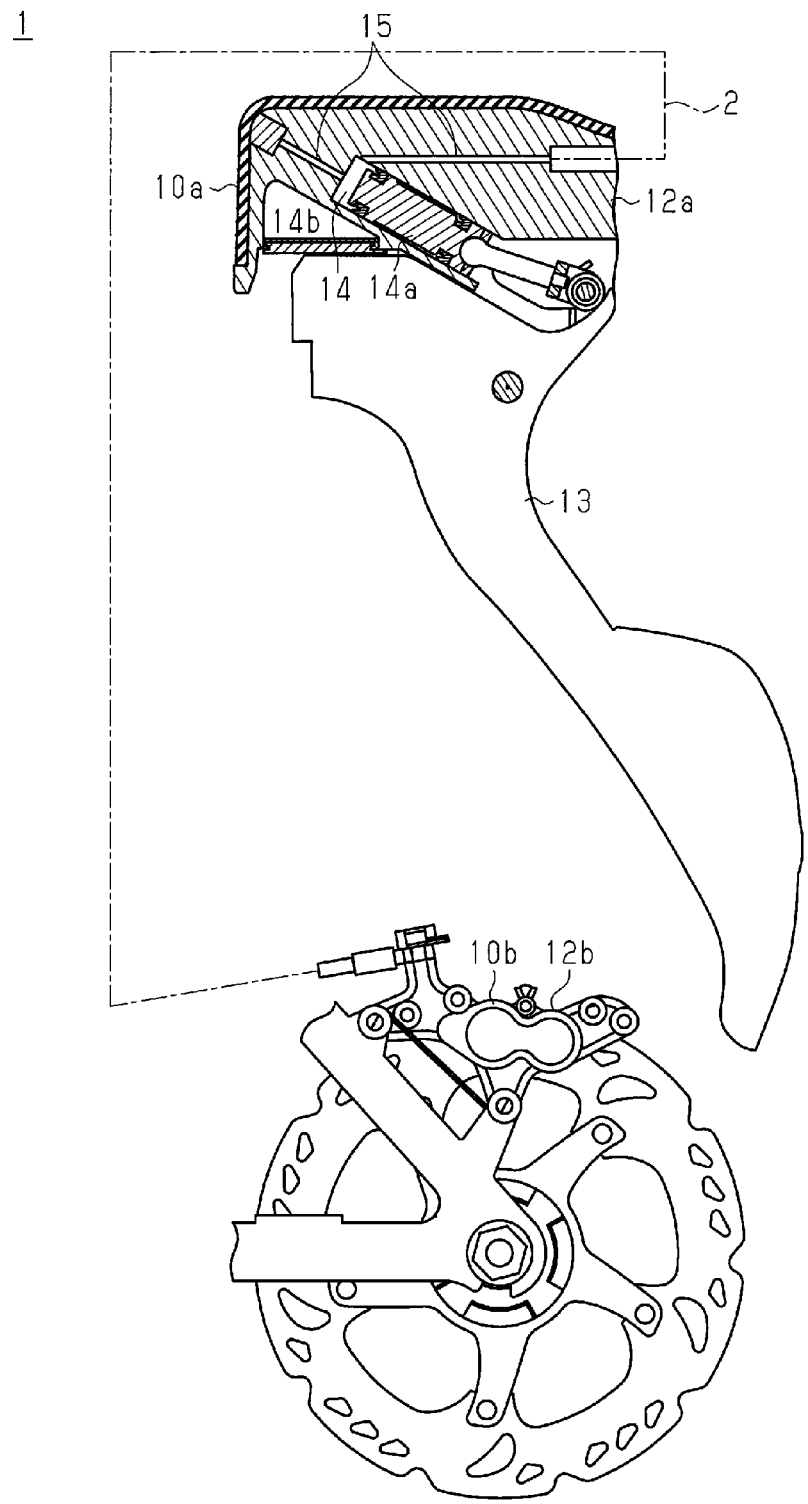
FIG. 1 is a schematic diagram showing a bicycle hydraulic system including one embodiment of a bicycle hydraulic component.

One embodiment of a bicycle hydraulic system 1 according to the present invention will now be described. As shown in FIG. 1, the bicycle hydraulic system 1, which may be a bicycle hydraulic brake system, includes a bicycle hydraulic operating device 10a and a bicycle hydraulic operated device 10b. The bicycle hydraulic operating device 10a and/or the bicycle hydraulic operated device 10b is an example of the bicycle component of the present invention.

The bicycle hydraulic operating device 10a is coupled to, for example, a bicycle handlebar. The bicycle hydraulic operated device 10b, which may be a brake caliper, is coupled to, for example, a bicycle frame. The bicycle hydraulic operating device 10a is connected to the bicycle hydraulic operated device 10b by a hydraulic hose 2 in a fluid communicable manner.

The bicycle hydraulic operating device 10a includes a base 12a (also referred to as body) and an operation portion 13 (e.g., lever arm), which is pivotally supported by the base 12a. The base 12a includes a hydraulic chamber 14 and a plurality of hydraulic passages 15, which are in direct or indirect communication with the hydraulic chamber 14. The hydraulic chamber 14 accommodates a piston 14a (master piston), which moves in accordance with the operation of the operation portion 13. The hydraulic chamber 14 is in communication with a fluid reservoir 14b. During the use of the bicycle hydraulic system 1, the hydraulic chamber 14, the fluid reservoir 14b, and the hydraulic passages 15 are filled with fluid such as mechanical oil.

Although not shown in the drawings, the bicycle hydraulic operated device 10b includes a base 12b, which includes a hydraulic chamber, and a piston (slave piston), which is accommodated in the hydraulic chamber. The slave piston of the bicycle hydraulic operated device 10b is configured to move in accordance with operation of the bicycle hydraulic operating device 10a and press a brake pad against a rotor. In this manner, the bicycle hydraulic operated device 10b generates braking force.

Figure 3:
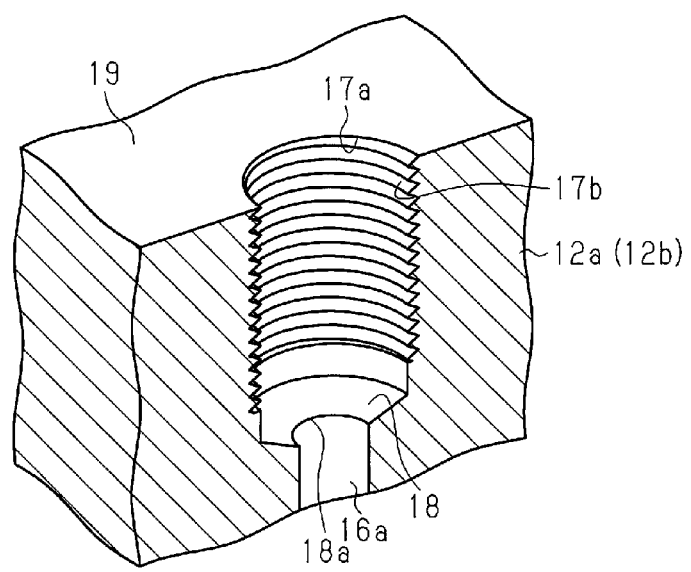
FIG. 3 is a perspective view showing a portion of the bicycle hydraulic component of FIG. 2.
Figure 4:
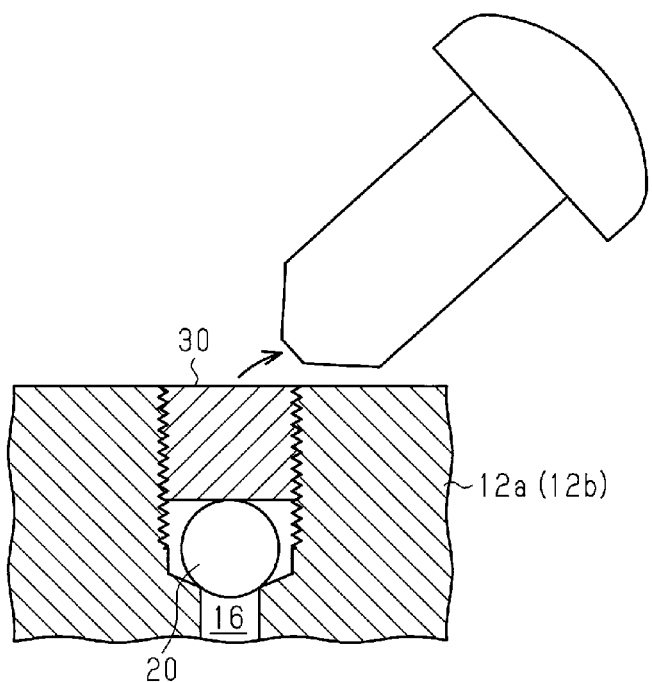
FIG. 4 is a schematic view showing separation between an external thread and a head of a shear head bolt.

The bicycle hydraulic operating device 10a will now be described with reference to FIGS. 2 to 4. Here, the structure described below is also applicable to the bicycle hydraulic operated device 10b. When applied to the bicycle hydraulic operated device 10b, the specification may be read by replacing "base 12a" with "base 12b" to eliminate the need for an overlapping description.

The base 12a includes a first bore 16, a second bore 17, and a seat surface 18. Additionally, a fluid stopper 20 and a plug 30 are located in the base 12a.

The first bore 16 is in fluid communication with the hydraulic chamber 14. In the present embodiment, the first bore 16 is located at an end of any one of the hydraulic passages 15, which are in direct or indirect communication with the hydraulic chamber 14. The second bore 17 extends from the first bore 16 to an outer surface 19 of the base 12a and includes an outer opening 17a in the outer surface 19. The first bore 16 has a bore diameter (first bore diameter), and the second core 17 has a bore diameter (second bore diameter) that is greater than that of the first bore 16. The first bore 16 and the second bore 17 may be referred to as a stepped hole. As shown in FIG. 3, in the present embodiment, the first bore 16 is a straight hole defined by a smooth inner surface 16a, and the second bore 17 is defined by a wall surface 17b including an internal thread.

The seat surface 18 extends between the first bore 16 and the second bore 17. The seat surface 18 includes an inner edge 18a defining a circular opening where the first bore 16 opens. As shown in FIG. 3, the seat surface 18 of the present embodiment includes an annular inclined surface, which is inwardly inclined from the second bore 17 toward the first bore 16. It is preferred that the annular inclined surface extend over the entire seat surface 18. However, the annular inclined surface may be a radially inner local portion of the seat surface 18.

The fluid stopper 20 is accommodated in the second bore 17 to close the first bore 16. As shown in FIG. 2, a gap G extends between the wall surface 17b of the second bore 17 and a radially outermost surface 20a of the fluid stopper 20. Thus, the fluid stopper 20 is not fitted to the second bore 17. In the present embodiment, the fluid stopper 20 is a ball having a diameter d1 of, for example, 2 to 3.5 mm. As shown in FIG. 2, the fluid stopper 20 has a center point CP. The center point CP may be the center of gravity of the fluid stopper 20 or the radial center of the fluid stopper 20.

The plug 30, which is coupled to the second bore 17, presses the fluid stopper 20 in the axial direction toward the seat surface 18. The plug 30 includes an end face 31, which contacts and presses the fluid stopper 20. When the plug 30 presses the fluid stopper 20, the fluid stopper 20 directly contacts the plug 30 and the seat surface 18 to seal the first bore 16. In the present embodiment, the plug 30 is a shear head bolt including an external thread 32, which is meshed with the internal thread of the wall surface 17b of the second bore 17. As shown in FIG. 4, after the plug 30 is coupled to the second bore 17, the head of the shear head bolt may be separated from the external thread 32 of the shear head bolt.

The fluid stopper 20 and the plug 30 cooperate to prevent or limit the leakage of fluid from the first bore 16. The combination of the base 12a, which includes the first bore 16, the second bore 17, and the seat surface 18, with the fluid stopper 20 and the plug 30 may be referred to as the fluid sealing structure.

The advantages of the bicycle hydraulic operating device 10a (bicycle hydraulic operated device 10b), which is an example of the bicycle hydraulic component of the embodiment according to the present invention, will now be described.

Figure 2:
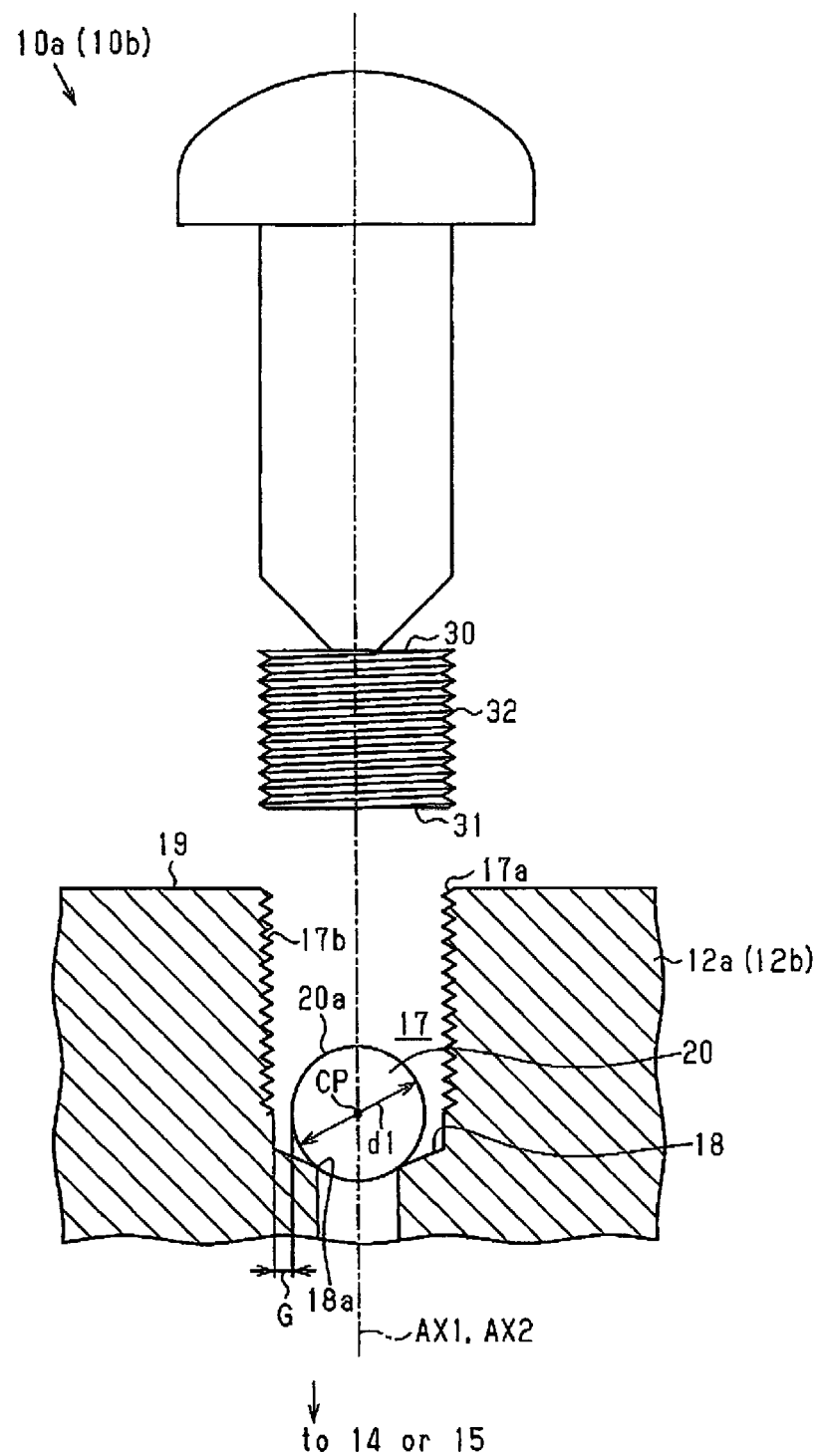
FIG. 2 is a partially cross-sectional schematic view showing the bicycle hydraulic component.
Figure 5:
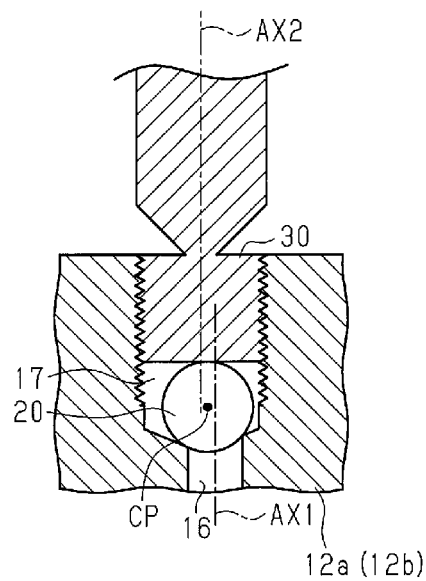
FIGS. 5 and 6 are schematic views each showing an example of misaligned bore axes of first and second bores.

(1) As shown in FIG. 2, ideally, a bore axis AX1 of the first bore 16 is aligned with a bore axis AX2 of the second bore 17. However, when the base 12a (12b) is bored to form the bores 16, 17, a sophisticated manufacturing technique or an expensive machining device is necessary to accurately align the bore axis AX1 of the first bore 16 with the bore axis AX2 of the second bore 17. Thus, as shown in FIG. 5, the bore axis AX1 of the first bore 16 may be misaligned with the bore axis AX2 of the second bore 17.

Figure 6:
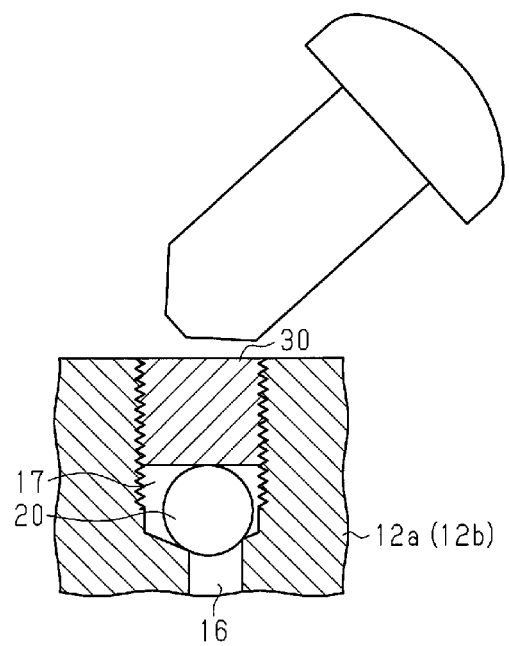

In this regard, the bicycle hydraulic operating device 10a (bicycle hydraulic operated device 10b) of the embodiment includes the base 12a (base 12b), the fluid stopper 20, and the plug 30. The base 12a (12b) includes the hydraulic chamber 14, the first bore 16, which has the first bore diameter and is in fluid communication with the hydraulic chamber 14, the second bore 17, which extends from the first bore 16 and has the second bore diameter that is greater than the first bore diameter, and the seat surface 18, which extends between the first bore 16 and the second bore 17. The plug 30 is coupled to the second bore 17. The fluid stopper 20 is configured to be accommodated in the second bore 17 and pressed by the plug 30 to close the first bore 16. The fluid stopper 20 is an individual member separate from the plug 30. In this configuration, since the fluid stopper 20 is an individual member separate from the plug 30, the plug 30 and the fluid stopper 20 cooperate to seal the first bore 16 (refer to FIGS. 4 and 6) regardless of whether or not the bore axis AX1 of the first bore 16 is aligned with the bore axis AX2 of the second bore 17.

Now, a comparative example will be considered. In the comparative example, a single bolt having a spherical end face is used instead of the plug 30 and the fluid stopper 20 of the embodiment. When the bore axes AX1, AX2 are misaligned, a gap may be formed between the spherical end face of the single bolt and the first bore 16 or the bolt may not be properly coupled to the second bore 17.

As described above, the bicycle hydraulic operating device 10a (bicycle hydraulic operated device 10b) of the present embodiment allows misalignment of the bore axis AX1 of the first bore 16 and the bore axis AX2 of the second bore 17 while obtaining a fluid sealing capability. This improves the yield rate and reduces the manufacturing costs.

Diversification of the bicycle hydraulic system 1 may result in the need for finer hydraulic passages 15 in the base 12a. As the first bore diameter becomes smaller, it becomes more difficult to accurately align the bore axis AX1 of the first bore 16 with the bore axis AX2 of the second bore 17. Thus, the advantages of the present embodiment become further outstanding as the first bore 16 becomes finer.

(2) In the embodiment, the plug 30 includes the end face 31, which contacts the fluid stopper 20 and presses the fluid stopper 20 against the seat surface 18. In this structure, the fluid stopper 20 is held between the plug 30 and the seat surface 18. This restricts axial movement of the fluid stopper 20.

(3) In the embodiment, the fluid stopper 20 directly contacts the seat surface 18, and the plug 30 directly contacts the fluid stopper 20. In this structure, an elastic seal element such as an O-ring may be omitted from between the fluid stopper 20 and the seat surface 18 and between the fluid stopper 20 and the plug 30. In a comparative example of a hydraulic component having, for example, a fluid sealing structure that is dependent on an elastic seal element such as an O-ring, the fluid sealing capability may be decreased by wear of the elastic seal element. However, in the structure that is not dependent on the elastic seal element, the fluid sealing capability is maintained over a long period of time.

(4) In the embodiment, as shown in FIG. 2, the fluid stopper 20 has the center point CP, the first bore 16 has the bore axis AX1, and the seat surface 18 is configured to align the center point CP of the fluid stopper 20 with the bore axis AX1 of the first bore 16 when the plug 30 presses the fluid stopper 20. In this configuration, the fluid stopper 20 contacts the entire inner edge 18a of the seat surface 18 and presses the entire inner edge 18a with a uniform force. This prevents or limits the leakage of fluid from the first bore 16.

(5) In the embodiment, the seat surface 18 includes the annular inclined surface, which is inwardly inclined from the second bore 17 toward the first bore 16. In this structure, the annular inclined surface guides the fluid stopper 20 to a predetermined position. For example, when the manufacturer of the bicycle hydraulic operating device 10a (bicycle hydraulic operated device 10b) drops the fluid stopper 20 into the second bore 17, the fluid stopper 20 moves along the annular inclined surface due to its weight and is automatically positioned in the first bore 16. This facilitates the manufacturing of the bicycle hydraulic operating device 10a (bicycle hydraulic operated device 10b).

(6) In the embodiment, the gap G is defined between the wall surface 17b of the second bore 17 and the radially outermost surface 20a of the fluid stopper 20. This structure lowers the dimensional accuracy required for the fluid stopper 20 and the second bore 17. This improves the yield rate of the bicycle hydraulic operating device 10a (bicycle hydraulic operated device 10b) and reduces the manufacturing costs of the bicycle hydraulic operating device 10a (bicycle hydraulic operated device 10b).

(7) In the embodiment, the second bore 17 includes the wall surface 17b having the internal thread, and the plug 30 is a bolt including the external thread 32, which is meshed with the internal thread of the wall surface 17b of the second bore 17. This structure allows the fluid stopper 20 to be pressed against the seat surface 18 by an inexpensive bolt.

(8) In the embodiment, the plug 30 is a shear head bolt. In this structure, the head is removed after the shear head bolt is fastened. This disables removal of the bolt from the second bore 17.

(9) In the embodiment, the seat surface 18 includes the inner edge 18a defining the circular opening, which is where the first bore 16 opens, and the fluid stopper 20 engages with the inner edge 18a to seal the circular opening. This structure limits or prevents the leakage of fluid from between the fluid stopper 20 and the first bore 16.

(10) In the embodiment, the fluid stopper 20 is a ball. In this structure, the shape of the fluid stopper 20 is isotropic. Thus, the manufacturer of the bicycle hydraulic operating device 10a (bicycle hydraulic operated device 10b) may place the fluid stopper 20 in the second bore 17 to seal the first bore 16 regardless of the direction in which the fluid stopper 20 is arranged. This facilitates the manufacturing of the bicycle hydraulic component. It is preferred that the diameter d1 of the ball be 2 to 3.5 mm. In this structure, the fluid stopper 20 is inexpensive.

(11) In the embodiment, the second bore 17 includes the outer opening 17a in the outer surface 19 of the base 12a (12b), and the plug 30 is configured to close the outer opening 17a of the second bore 17. In this configuration, the outer opening 17a of the second bore 17 can be closed by the plug 30 from the outer side of the base 12a (12b).

(12) In the embodiment, the fluid stopper 20 and the base 12a (12b) including the seat surface 18 are each a metal member. This configuration provides the bicycle hydraulic component with a durable fluid sealing structure.

(13) In the embodiment, the first bore 16 is located at the end of the corresponding hydraulic passage 15, which is in direct or indirect communication with the hydraulic chamber 14. This structure provides the bicycle hydraulic operating device 10a (bicycle hydraulic operated device 10b) with the fluid sealing structure that can prevent leakage of fluid from the hydraulic chamber 14 and the hydraulic passages 15 through the first bore 16.

The present invention is not limited to the above embodiment (or one or more of modes). For example, the embodiment may be modified as follows.

Figure 7:
FIGS. 7 and 8 are schematic perspective views each showing a modified example of a fluid stopper.
Figure 8:
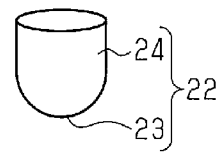

The fluid stopper 20 is not limited to a ball. For example, as shown in FIG. 7, a modified example of a fluid stopper 21 is semispherical. As shown in FIG. 8, another modified example of a fluid stopper 22 includes a semispherical end surface 23 and a rod portion 24. The manufacturer of the bicycle hydraulic operating device 10a (bicycle hydraulic operated device 10b) may insert the fluid stopper 21 or 22 into the second bore 17 so that the semispherical surface of the fluid stopper 21 or 22 is directed to the first bore 16 to seal the first bore 16. Therefore, the fluid stoppers 21, 22 having the semispherical surface have the same advantages as the spherical fluid stopper 20.

Figure 9:
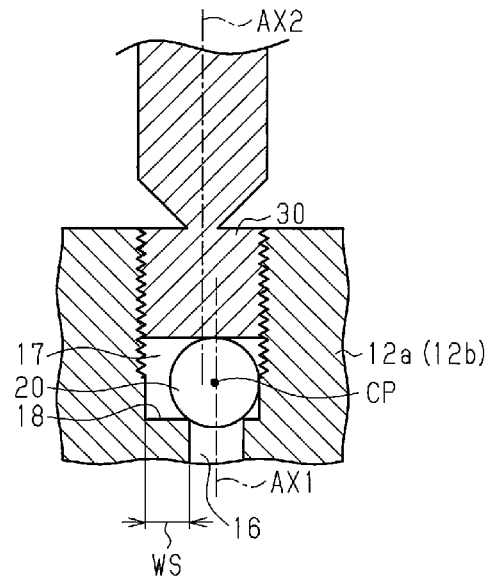
FIG. 9 is a schematic cross-sectional view showing a portion of a modified example of a seat surface.

In a modified example shown in FIG. 9, the seat surface 18 may be non-inclined surface. Even in this modified example, when inserted into the second bore 17, the fluid stopper 20 closes the first bore 16. Additionally, the fluid stopper 20, which is held by the plug 30 and the seat surface 18, is unmovable in the axial direction. When the seat surface 18 is a non-inclined surface, it is preferred that the maximum width WS of the seat surface 18 that is measured in the radial direction be less than or equal to the radius of the fluid stopper 20. In this dimensional relationship, when the fluid stopper 20 is inserted into the second bore 17, the fluid stopper 20 automatically closes the first bore 16.

The fluid stopper 20 and the base 12a (12b) do not have to be metal members. For example, in several modified examples, the fluid stopper 20 is a metal member, and the base 12a (12b) including the seat surface 18 is a synthetic resin member. The synthetic resin base 12a (base 12b) is advantageous in that the manufacturing costs of the bicycle hydraulic operating device 10a (bicycle hydraulic operated device 10b) can be reduced.

It is preferred that the plug 30 be a metal member. However, the plug 30 may be a nonmetal member such as a synthetic resin member.

Figure 10:
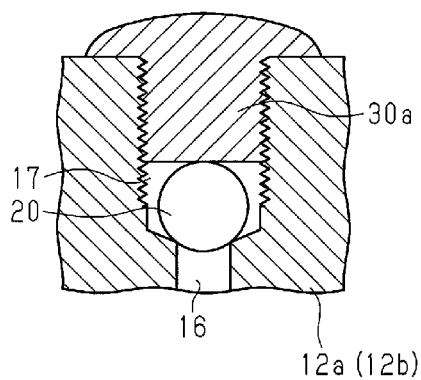
FIGS. 10 and 11 are schematic cross-sectional views each showing a portion of a modified example of a plug.
Figure 11:
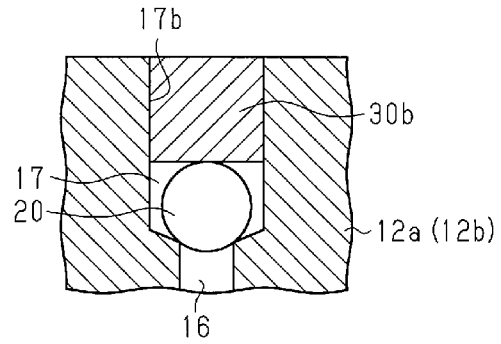

The plug 30 is not limited to a shear head bolt. In a modified example shown in FIG. 10, a plug 30a is an Allen key bolt or the like. In a modified example shown in FIG. 11, the wall surface 17b of the second bore 17 is smooth, and a plug 30b is configured to be press-fitted to the second bore 17. In the modified examples, the fluid stopper 20 may be pressed against the seat surface 18 by the plugs 30a, 30b, which are less expensive than the shear head bolt.

The positions of the bores 16, 17 are not particularly limited in the base 12a (12b). The outer opening 17a may be located anywhere in the outer surface 19 of the base 12a (12b).

The bicycle hydraulic system 1 is not limited to a hydraulic disc brake system and may be configured as a hydraulic system other than a hydraulic brake system such as a hydraulic gear change system, a hydraulic suspension system, or a hydraulic adjustable seatpost.

It should be apparent to those skilled in the art that the present invention may be embodied in many other specific forms without departing from the scope of the invention. For example, some of the components and portions may be omitted from all components described in the embodiment (or one or more of modes) or some of the components and portions may be combined. The present invention is to be considered by reference to the appended claims within the scope and equivalence of the appended claims.

The invention claimed is:

1. A bicycle hydraulic component comprising:
    a base including
        a hydraulic chamber,
        a first bore having a first bore diameter and being in fluid communication with the hydraulic chamber,
        a second bore extending from the first bore and having a wall and ending at an outer opening in an outer surface of the base and having a second bore diameter greater than the first bore diameter and the second bore diameter ends at the wall, and
        a seat surface having an inner edge defining a circular opening of the first bore and the seat surface extending between the inner edge of the circular opening of the first bore and the wall of the second bore;
    a plug coupled to the second bore and the plug is configured to close the outer opening of the second bore; and
    a fluid stopper having a radially outmost surface smaller in size than the diameter of the second bore and the fluid stopper engages with the inner edge of the seat surface and seals the circular opening of the inner edge of the seat surface, the fluid stopper being an individual member with respect to the plug;
    a gap between the exterior surface of the fluid stopper and the wall of the second bore exists when the fluid stopper is positioned on the seat surface;
    the plug presses the fluid stopper onto the seat surface to seal the first bore when closing the second bore.

2. The bicycle hydraulic component according to claim 1, wherein the plug includes an end face that contacts the fluid stopper.

3. The bicycle hydraulic component according to claim 1, wherein
    the fluid stopper has a center point,
    the first bore has a bore axis, and
    the seat surface is configured such that the plug presses the fluid stopper to align the center point of the fluid stopper with the bore axis of the first bore.

4. The bicycle hydraulic component according to claim 3, wherein the seat surface includes an annular inclined surface inwardly inclined from the second bore toward the first bore.

5. The bicycle hydraulic component according to claim 1, wherein
    the second bore includes an internal thread, and
    the plug is a bolt including an external thread meshed with the internal thread of the second bore.

6. The bicycle hydraulic component according to claim 5, wherein the plug is a shear head bolt.

7. The bicycle hydraulic component according to claim 1, wherein the fluid stopper includes a spherical or semispherical outer surface.

8. The bicycle hydraulic component according to claim 1, wherein the fluid stopper is a ball.

9. The bicycle hydraulic component according to claim 8, wherein the ball has a diameter of 2 to 3.5 mm.

10. The bicycle hydraulic component according to claim 1, wherein the fluid stopper and the base including the seat surface are metallic members.

11. The bicycle hydraulic component according to claim 1, wherein
    the fluid stopper is a metallic member, and
    the base including the seat surface is a synthetic resin member.

12. The bicycle hydraulic component according to claim 1, wherein the plug is press-fitted to the second bore.

13. The bicycle hydraulic component according to claim 1, wherein the first bore is located at an end of a hydraulic passage which is in direct or indirect communication with the hydraulic chamber.

14. The bicycle hydraulic component according to claim 1, wherein the base is at least one of a main body of a bicycle hydraulic operating device and a main body of a bicycle hydraulic operated device.

* * * * *